US012624863B2

(12) United States Patent
Valencia et al.

(10) Patent No.: US 12,624,863 B2
(45) Date of Patent: May 12, 2026

(54) POOL HEATER BYPASS SYSTEMS AND METHODS

(71) Applicant: Rheem Manufacturing Company, Atlanta, GA (US)

(72) Inventors: Ryan Joseph Valencia, Oxnard, CA (US); Juan Carlos Montanez, Oxnard, CA (US); Alexander Stephen Chow, Camarillo, CA (US); Satya Kiran Gullapalli, Ventura, CA (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

(21) Appl. No.: 18/439,540

(22) Filed: Feb. 12, 2024

(65) Prior Publication Data

US 2024/0271442 A1     Aug. 15, 2024

Related U.S. Application Data

(60) Provisional application No. 63/484,566, filed on Feb. 13, 2023.

(51) Int. Cl.
*F24H 15/325*    (2022.01)
*E04H 4/12*    (2006.01)
(Continued)

(52) U.S. Cl.
CPC ........... *F24H 15/325* (2022.01); *E04H 4/129* (2013.01); *F24D 19/1021* (2013.01); *F16L 41/03* (2013.01);
(Continued)

(58) Field of Classification Search
CPC ................ F24H 15/325; F28F 2250/06; F24F 2012/007; F24D 19/1021
See application file for complete search history.

(56) References Cited

U.S. PATENT DOCUMENTS 4,988,127 A * 1/1991 Cartensen ............. F16L 15/008
285/94
5,014,770 A * 5/1991 Palmer .................. F24F 5/0046
165/48.2
(Continued)

FOREIGN PATENT DOCUMENTS

CN          207170042 U  *  4/2018
CN          115095896 A  *  9/2022  ........... F24D 3/1058

*Primary Examiner* — Atif H Chaudry
(74) *Attorney, Agent, or Firm* — Eversheds Sutherland (US) LLP

(57)          ABSTRACT

A bypass system is provided for use with a pool water heater having a pool water heater input port configured to receive a portion of pool water, a heating system configured to heat water received by the pool water heater input port, and a pool water heater output port configured to output heated water from the heating system. The bypass system includes a pool water receiving port configured to receive pool water, a bypass line configured to divert a portion of the water from the pool, an output port configured to output the portion of pool water from the pool, a pool water heater receiving port configured to receive the heated water from the heating system, and a pool output port configured to output, to the pool, a combination of the heated water from the heating system and the portion of the water from the pool.

20 Claims, 12 Drawing Sheets

(51) Int. Cl.
    *F24D 19/10*         (2006.01)
    *F24F 12/00*         (2006.01)
    *F16L 41/03*         (2006.01)
(52) U.S. Cl.
    CPC ..... *F24F 2012/007* (2013.01); *F28F 2250/06*
                  (2013.01)

(56) References Cited

U.S. PATENT DOCUMENTS

| | | | |
|---|---|---|---|
| 2004/0004034 A1* | 1/2004 | Hornsby | F16K 31/0668 |
| | | | 210/167.12 |
| 2005/0230243 A1* | 10/2005 | Martin | F28F 19/004 |
| | | | 204/196.01 |
| 2007/0244576 A1* | 10/2007 | Potucek | G05D 23/1902 |
| | | | 700/55 |
| 2008/0223561 A1* | 9/2008 | Li | F28F 27/02 |
| | | | 165/156 |
| 2018/0058722 A1* | 3/2018 | Cool | F24H 15/238 |
| 2021/0190372 A1* | 6/2021 | Montanez | F24H 15/144 |

* cited by examiner

316

308

POOL HEATER BYPASS SYSTEMS AND METHODS

CROSS-REFERENCE TO RELATED APPLICATIONS

This application claims priority to and benefit of U.S. provisional patent application No. 63/484,566 filed Feb. 13, 2023, which is herein incorporated by reference.

FIELD

This disclosure relates generally to pool heating systems and methods and more particularly relates to pool heating bypass systems and methods.

BACKGROUND

FIG. 1 illustrates a pool heating system 100. The pool heating system 100 may include a pool 102, a filter 104, a heater 106, a bypass line 110, a return line 112, a heater input line 114, and a return line 116. In operation, water from the pool 102 may be continuously drawn to the filter 104 via a pump or the like through the return line 112. The filter 104 may be configured to filter the water from the pool 102 and then output the filtered water to the heater 106 via the heater input line 114.

The heater 106 may include a heating mechanism and a header 108. The heating mechanism may be any type of heating mechanism, including, for example, a gas-fired heating mechanism, a heat pump heating mechanism, and/or an electrical heating mechanism to heat the water. In some instances, the header 108 may form a cap at the end of the heating mechanism, sometimes called a manifold, which is configured to exchange heat with the water before it is returned to the pool 102.

In operation, water may be extracted from the pool 102 (e.g., through a pump or the like) through the return line 112 to the filter 104. The filter 104 may be configured to filter particulates in the water from the pool 102 and pass the filtered water to the heater 106 via the heater input line 114. The header 108 of the heater 106 may be configured to receive the water from the heater input line 114. At this point, some of the water from the heater input line 114 may be heated at the header 108. This heated water may be outputted to the pool 102 via the return line 116.

However, a portion of the water from the heater input line 114 may be transferred to the return line 116, by way of the bypass line 110, without being heated by the heater 106. In particular, the bypass line 110 may enable the pool heating system 100 to control the flow of heated water into the pool 102 by mixing a portion of the heated water with water that is not heated, i.e., water that bypasses the heating mechanism of the heater 106.

The pool system 100 is effective to maintain a predetermined temperature of water in the pool 102. However, if there are any problems with the bypass line 110, the issue may be costly, as maintenance person would need access the heater 106 to provide any maintenance.

BRIEF DESCRIPTION OF THE DRAWINGS

The detailed description is set forth with reference to the accompanying drawings. In some instances, the use of the same reference numerals may indicate similar or identical items. Various embodiments may utilize elements and/or components other than those illustrated in the drawings, and some elements and/or components may not be present in various embodiments. Throughout this disclosure, depending on the context, singular and plural terminology may be used interchangeably.

DETAILED DESCRIPTION

In accordance with one or more embodiments of the present disclosure, a pool heating system is provided wherein a bypass system for bypassing the heating element of the pool heater may be disposed at least partially outside of the pool heater housing to be easily accessible for maintenance.

In certain embodiments, a bypass system may be externally affixed to or otherwise associated with a pool heater in a pool heating system. The bypass system may include at least four ports and an internal bypass line. In some instances, the four ports may include two input ports and two output ports. One input port may be configured to receive water from the pool, via a pool filter, and one output port may be configured to output a portion of this received water to the pool heater to be heated. The other input port may be configured to receive heated water from the pool heater, and the other output port may be configured to output the heated water, which is mixed with a portion of the water from the pool, to the pool. In particular, the bypass line may be configured to flow a portion of the water received from the pool, via the one input port, to be mixed with the heated water received by the other input port. This bypass system may help maintain the flow of the water through the heater.

Because the bypass system is externally associated with the pool heater, all elements of the bypass system may be inspected, fixed, or replaced as needed without needing to access the pool heater itself.

Turning now to the drawings, an example pool heating system in accordance with aspects of the present disclosure will now be described in greater detail with reference to FIGS. 2-7.

Figure 1:
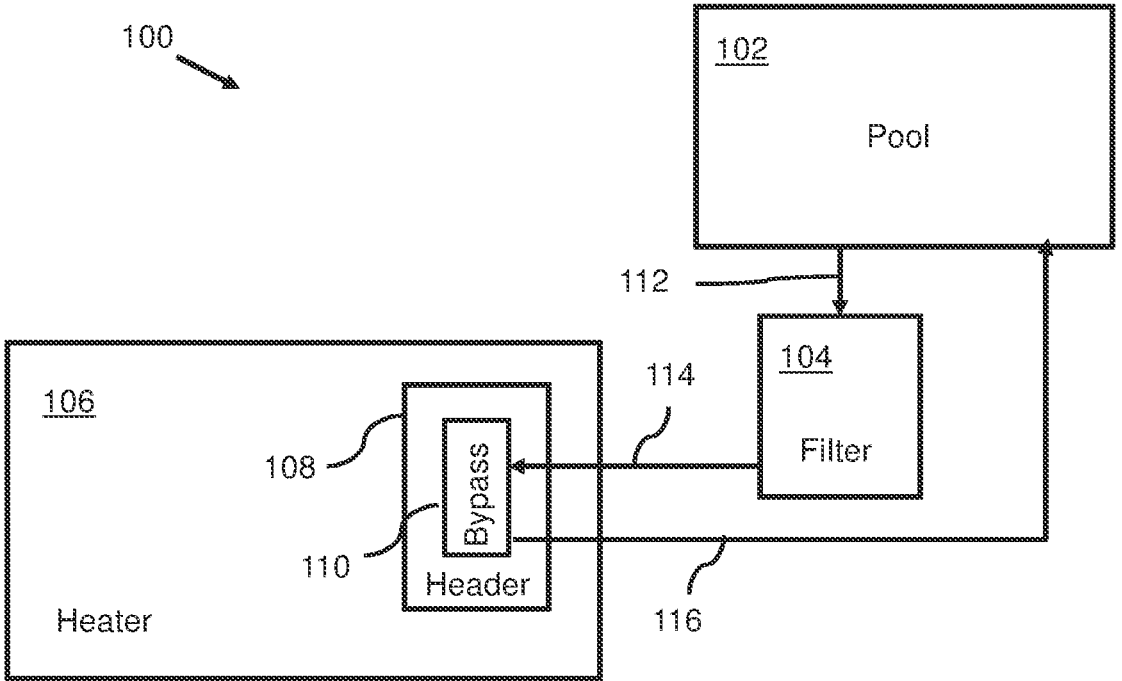
FIG. 1 illustrates a pool heating system.
Figure 2:
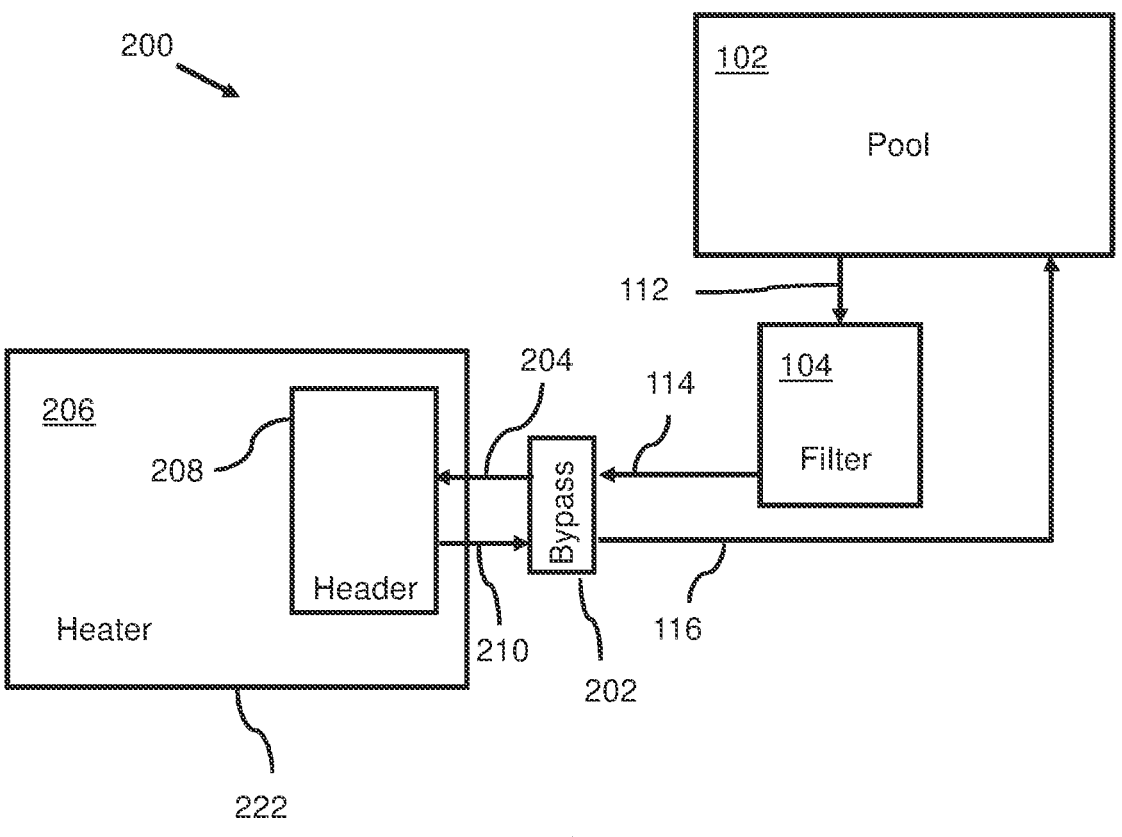
FIG. 2 illustrates a pool heating system in accordance with one or more embodiments of the present disclosure.

FIG. 2 illustrates a pool heating system 200 in accordance with one or more embodiments of the present disclosure. The pool heating system 200 may include the pool 102, the filter 104, a bypass system 202, and a heater 206. The heater 206 may include a header 208. The return line 112 may be configured to provide water from the pool 102 to the filter 104. The filter 104 may be configured to filter water from the pool 102 and to provide the filtered water to the heater input line 114. However, in contrast with the system described above with reference to FIG. 1, in accordance with one or more embodiments of the present disclosure, water from the heater input line 114 may be provide to the bypass system 202, which may be external to the heater 206. That is, the bypass system 202 may be disposed about an exterior of the heater 206. For example, the heater 206 may include an outer shell or casing 222, and the bypass system 202 may be disposed outside of the casing 222.

The bypass system 202 may be configured to receive water via the heater input line 114 and to output heated water to the pool 102 via the return line 116. Further, the bypass system 202 may be configured to provide a portion of the water from the heater input line 114 to the header 208 of the heater 206 via a header input line 204 so as to heat the water. Still further, the bypass system 202 may additionally be configured to receive heated water from the header 208 via a header output line 210. In some instances, the bypass system 202 may be configured to mix a portion of the water received via the heater input line 114 with the water from the header 208 as received via the header output line 210 so as to output the mixture as the heated water to the pool 102 via the return line 116.

Figure 3:
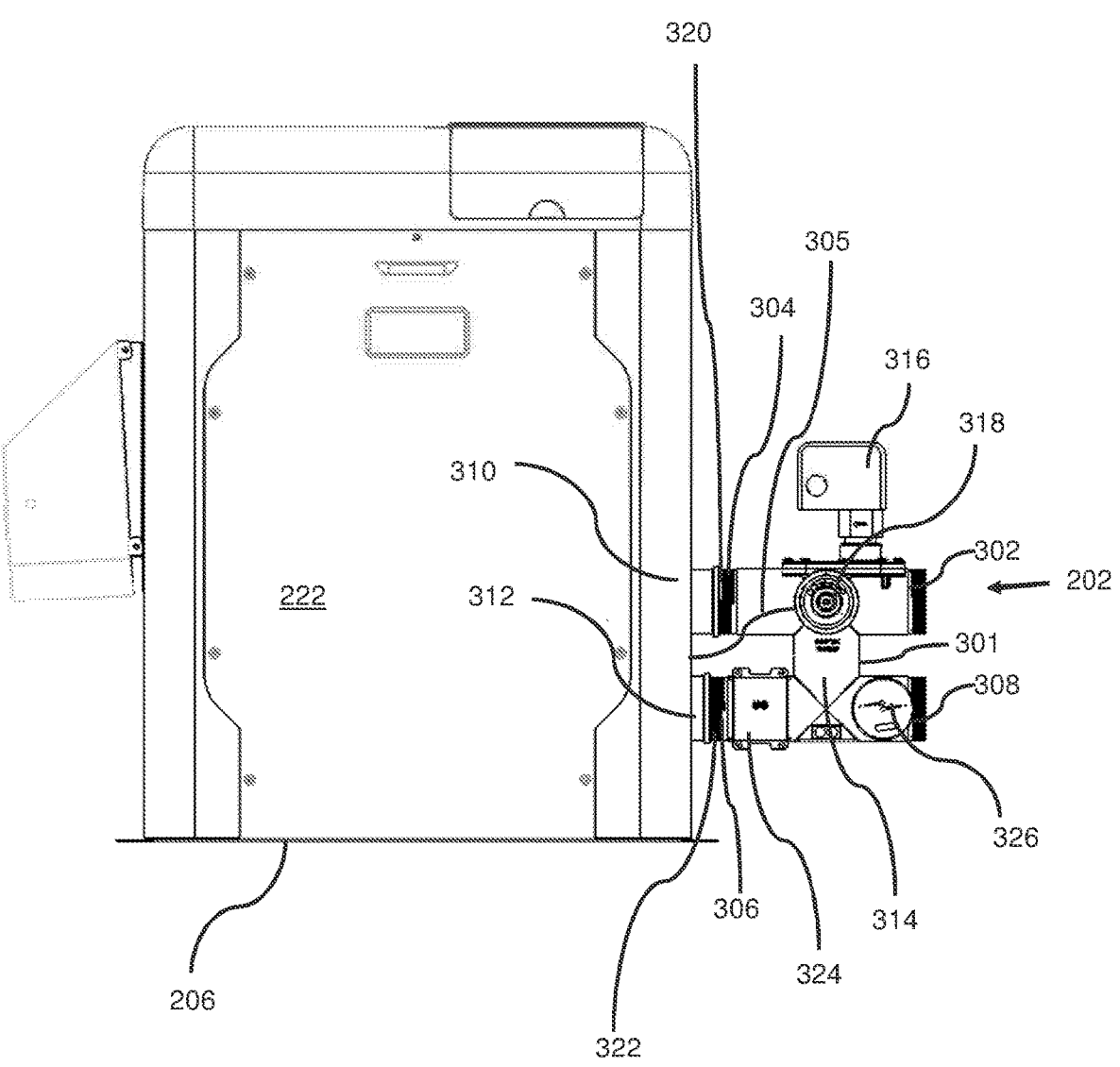
FIG. 3 illustrates an enlarged view of the heater and bypass system of the pool heating system of FIG. 2 in accordance with one or more embodiments of the present disclosure.

FIG. 3 illustrates an enlarged view of the heater 206 and the bypass system 202 of the pool heating system 200 of FIG. 2. As depicted in FIG. 3, the bypass system 202 may include a bypass body 301 that includes a pool water receiving port 302, an output port 304, a pool water heater receiving port 306, a pool output port 308, and a bypass line 314. The pool water receiving port 302 may be configured to receive water from the pool, which in this example is via a filter. The output port 304 may be configured to output a portion of the water received by the pool water receiving port 302 to a heater input line 310.

In some embodiments, the pool water receiving port 302, the output port 304, the pool water heater receiving port 306, and the pool output port 308 have a common diameter that corresponds to the diameter of piping used to receive water from the pool and the diameter of piping used to return water to the pool. In some of these embodiments, the diameter of the pool water receiving port 302, the output port 304, the pool water heater receiving port 306, and the pool output port 308 is 2 inches.

The bypass body 301 may be formed of any corrosion resistant material, such as copper, or non-metals, such as plastic, or polyvinyl chloride (PVC), or the like. In some embodiments, the bypass body 301 is made of PVC as opposed to copper to decrease material costs and installation costs.

The heater 206 may be configured to heat water as received via the heater input line 310 by any heating method, non-limiting examples of which include gas-fired heating, electrical heating, and/or vapor compression cycle heating (e.g., a heat pump or the like). Any suitable heating systems and methods may be used.

The heater 206 may additionally be configured to output water that has been heated to a heater output line 312. The heater output line 312 may be configured to output heated water from the heater 206 to the pool water heater receiving port 306 of the bypass system 202. The bypass line 314 may be configured to divert a portion of the water received by the pool water receiving port 302 from the output port 304. In some instances, the bypass line 314 may be larger (e.g., have a 0.030 larger diameter) than the diameter of the pool water receiving port 302, the output port 304, the pool water heater receiving port 306, and the pool output port 308. In some instances, the bypass line 314 may be smaller. The bypass line 314 may be any suitable size, shape, or configuration. The diverted portion of the water received by the pool water receiving port 302 may be mixed with the water from the pool water heater receiving port 306. In this manner, the pool output port 308 may be configured to output, to the pool 102, the mixture of the water received by the pool water receiving port 302 and the water from the pool water heater receiving port 306.

Still referring to FIG. 3, the bypass system 202 may additionally include, as mounted to or otherwise associated with the bypass body 301, a flow switch 316, a sacrificial anode 318, a buttress threaded collar 320, a buttress threaded collar 322, a unitherm governor 324, and/or a temperature/pressure gauge 326.

The flow switch 316 may be any type of device that is configured to detect and output (e.g., via a display or the like) a rate of flow of water through the pool water receiving port 302.

The sacrificial anode 318 may be any cathodic protecting device that is configured to attract negative ions from water received through the pool water receiving port 302. In a non-limiting example, the sacrificial anode 318 may include a zinc anode having a ground wire 305 connecting the sacrificial anode 318 to a grounded portion of the heater 206. In this example, the header may be made of copper, wherein the zinc of the sacrificial anode 318 may attract negative ions prior to the copper header. As such, the zinc of the sacrificial anode 318 may oxidize, i.e., corrode, prior to the copper header. In this manner, the external sacrificial anode 318 may be easily replaced, as opposed to removing and replacing the internal copper header.

As noted above, the sacrificial anode 318 may oxidize prior to the metal of the metal header of the heater 206. The sacrificial anode 318 may be removable, and therefore, replaceable. In this manner, when the sacrificial anode 318 becomes sufficiently oxidized, it may be removed and replaced with a new sacrificial anode, thus extending the life of the metal header of the heater 206, which may be made of copper or the like.

The unitherm governor 324 may be any device or system that is configured to regulate the amount of hot water from the heater 208 that will be mixed with the cool water provided by the bypass line 314. The unitherm governor 324 may be configured to only let water escape the heater 208 when that water has reached a predetermined temperature, for example 120° F. The predetermined temperature may by any suitable temperature.

Figure 4:
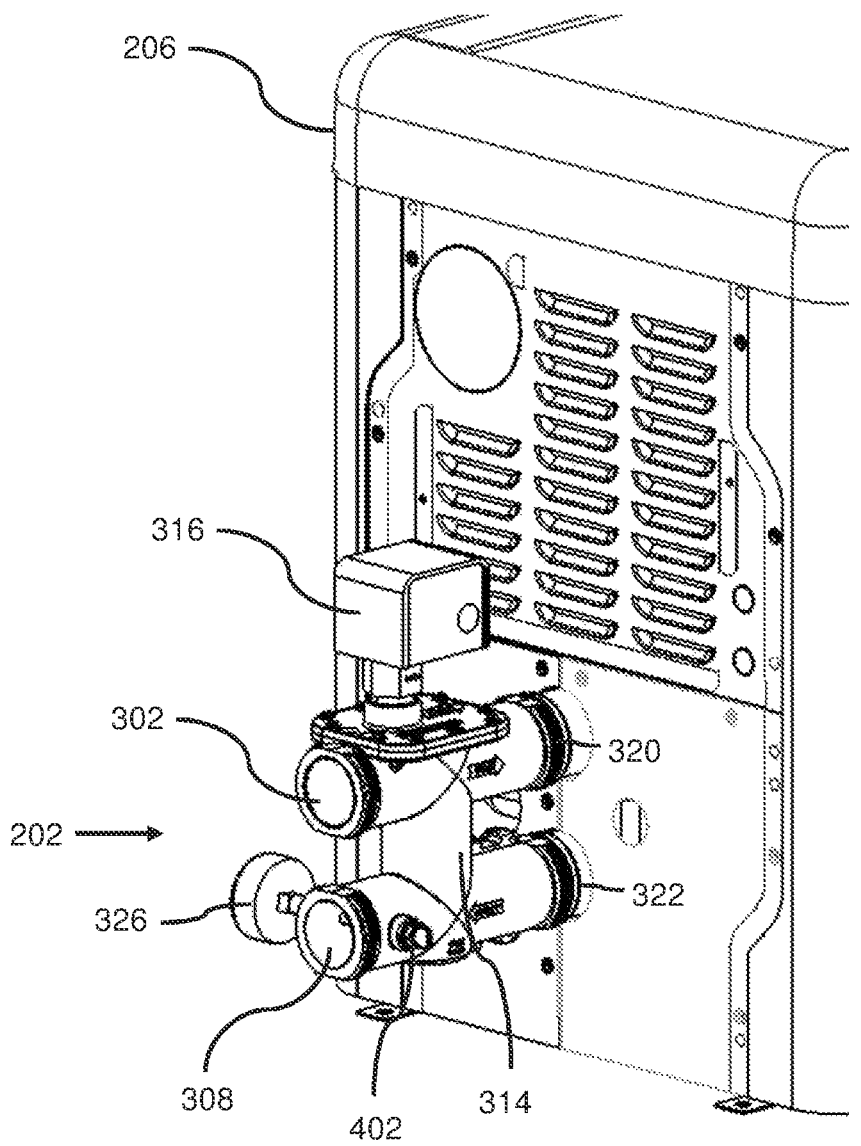
FIG. 4 illustrates a rear perspective view of the heater and bypass system of the pool heating system of FIG. 3 in accordance with one or more embodiments of the present disclosure.

FIG. 4 illustrates a perspective rear view of the heater 206 and the bypass system 202 of the pool heating system 200 of FIG. 3. As depicted in FIG. 4, the bypass system 202 may additionally include a drain plug 402. In this embodiment, the drain plug 402 may be disposed at an area of the pool output port 308. In operation, the drain plug 402 may be configured to be removed to open a port to drain water from the heater 206.

Figure 5:
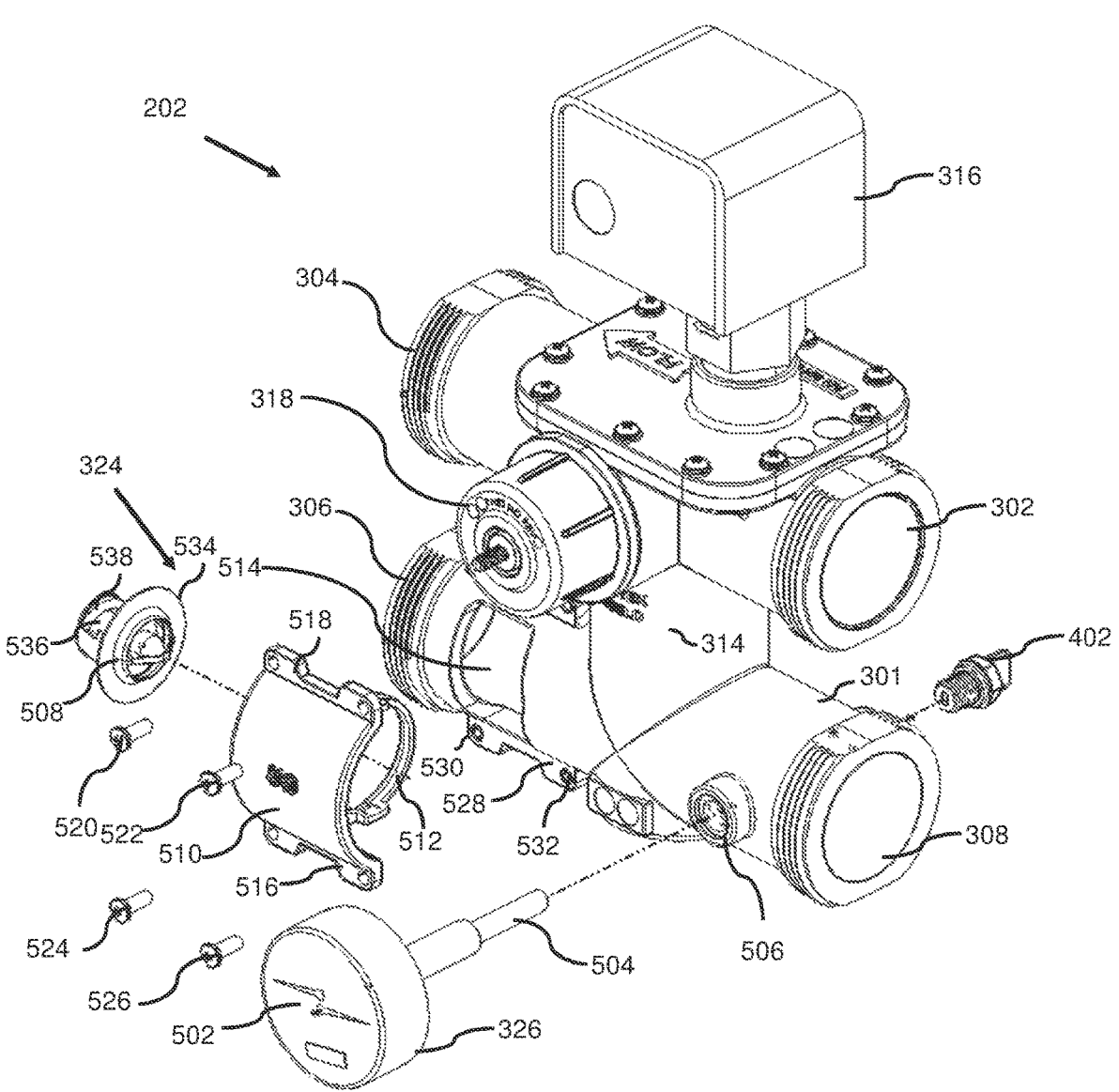
FIG. 5 illustrates an exploded view of the bypass system of the pool heating system of FIG. 3 in accordance with one or more embodiments of the present disclosure.

FIG. 5 illustrates an exploded view of the bypass system 200 of the pool heating system of FIG. 3. The temperature pressure gauge 326 may include a face 502 and a probe 504. The face 502 may include a display or the like. The display may be analog or digital. The probe 504 may be configured to fit into a probe port 506 within the pool output port 308. The probe 504 may be any type of probe that is capable of detecting pressure and temperature of water passing through the pool output port 308. In certain embodiments, the face 502 may provide an indication of pressure and temperature of water passing through the pool output port 308 as detected by the probe 504.

The unitherm governor 324 may include a capron 508 and a mounting plate 510. The mounting plate 510 may include a circular mounting flange 512 to receive the capron 508. In certain embodiments, when mounted in the circular mounting flange 512, the mounting plate 510 may be mounted onto the bypass system 202 such that the capron 508 within the circular mounting flange 512 is disposed within a mounting hole 514. The capron 508 may be removable, and therefore, replaceable through the mounting hole 514.

The mounting plate 510 may include an upper flange 518 and a lower flange 516. In some instances, one or more mounting screws 520 and 522 may be used to attach the upper flange 518 to a corresponding receiving flange on the pool water receiving port 306. Any suitable attachment and/or fastener system may be used. Further, the mounting screws 524 and 526 may be used to attach the lower flange 516 to a receiving flange 528 via screw holes 530 and 532, respectively.

The capron 508 may include a circular beveled cap 534, a restoring spring 538, and a metal piston 536. The beveled cap 534 may be configured to engage with the circular mounting flange 512 of the mounting plate 510 to limit the amount of water from the heater 206 that is passed and mixed with pool water from the bypass 314. In some instances, when water from the heater 206 is not above a predetermined threshold, the beveled cap 534 may rest on the circular mounting flange 512, thus inhibiting water from passing. However, in other instances, as the temperature of the water from the heater 206 increases, the metal piston 536 may expand from the thermal expansion. In some instances, the expanding metal piston 536 may stretch the restoring spring 538 and push the beveled cap 534 away from the circular mounting flange 512, thus permitting hot water to pass and mix with pool water from the bypass 314. In the event the water from the heater 206 starts to cool, then the metal piston 536 may contract. Further, in such instances, the restoring spring 538 may contract, thus pulling the circular mounting flange 512 back to rest on the circular mounting flange 512. This heating and cooling cycle may continue, thus providing a regulated amount of hot water to be returned to the pool 102.

Figure 6:
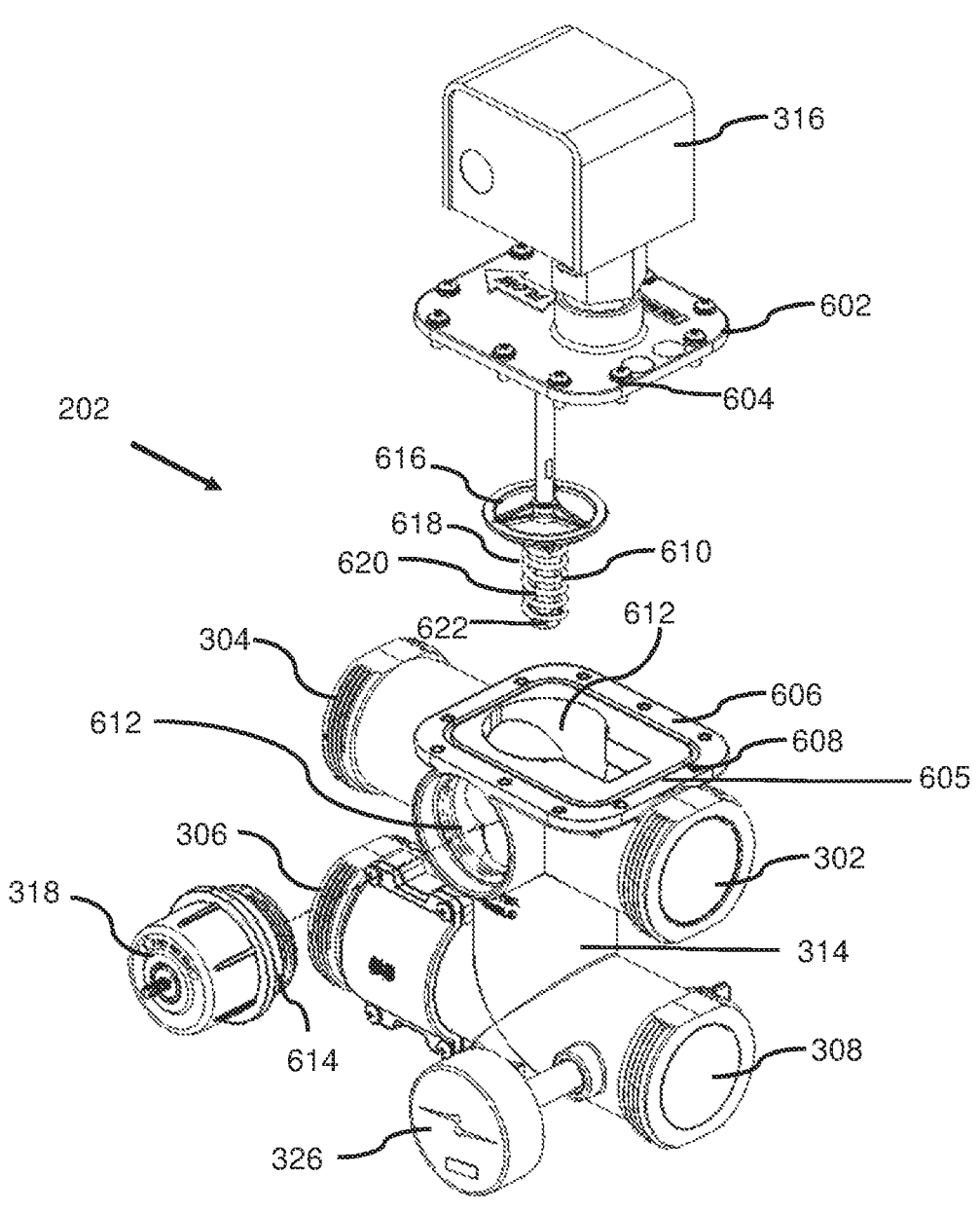
FIG. 6 illustrates another exploded view of the bypass system of the pool heating system of FIG. 3 in accordance with one or more embodiments of the present disclosure.

FIG. 6 illustrates another exploded view of the bypass system 202 of the pool heating system of FIG. 3. In certain embodiments, the flow switch 316 and the sacrificial anode 318 may be separated. The flow switch 316 may be mountable via a mounting plate 602 having a plurality of mounting screws, a sample of which is indicated as mounting screw 604. The mounting plate 602 may be configured to mount to a mounting gasket 606, disposed on a receiving platform 605 having a plurality of corresponding mounting screw receiving holes, a sample of which is indicated as mounting screw receiving hole 608. Any suitable attachment or fastener system may be used. A bypass flow regulator 610 may be configured to pass into a mounting hole 612 when the flow switch 316 is mounted onto the mounting gasket 606. The mounting plate 602 is optional and the flow switch 316 may also be mountable in any other suitable manner.

The sacrificial anode 318 may be configured to be mounted into an anode mounting hole 612. For example, sacrificial anode 318 may be mounted via a threaded collar 614. In this manner, the sacrificial anode 318 may be easily removed and replaced as needed. Any suitable attachment or fastener system may be used.

The bypass flow regulator 610 may include a circular pressure plate 616, a restoring spring 618, a central column 620, and a mounting nut 622. In some instances, the central column 620 may be configured to extend from the mounting plate 602, centrally down through the circular pressure plate 616, down through the restoring spring 618 and to the mounting nut 622. The restoring spring 618 may be configured to mount on one end to the circular pressure plate 616 and on the other end to the mounting nut 622.

Figure 7:
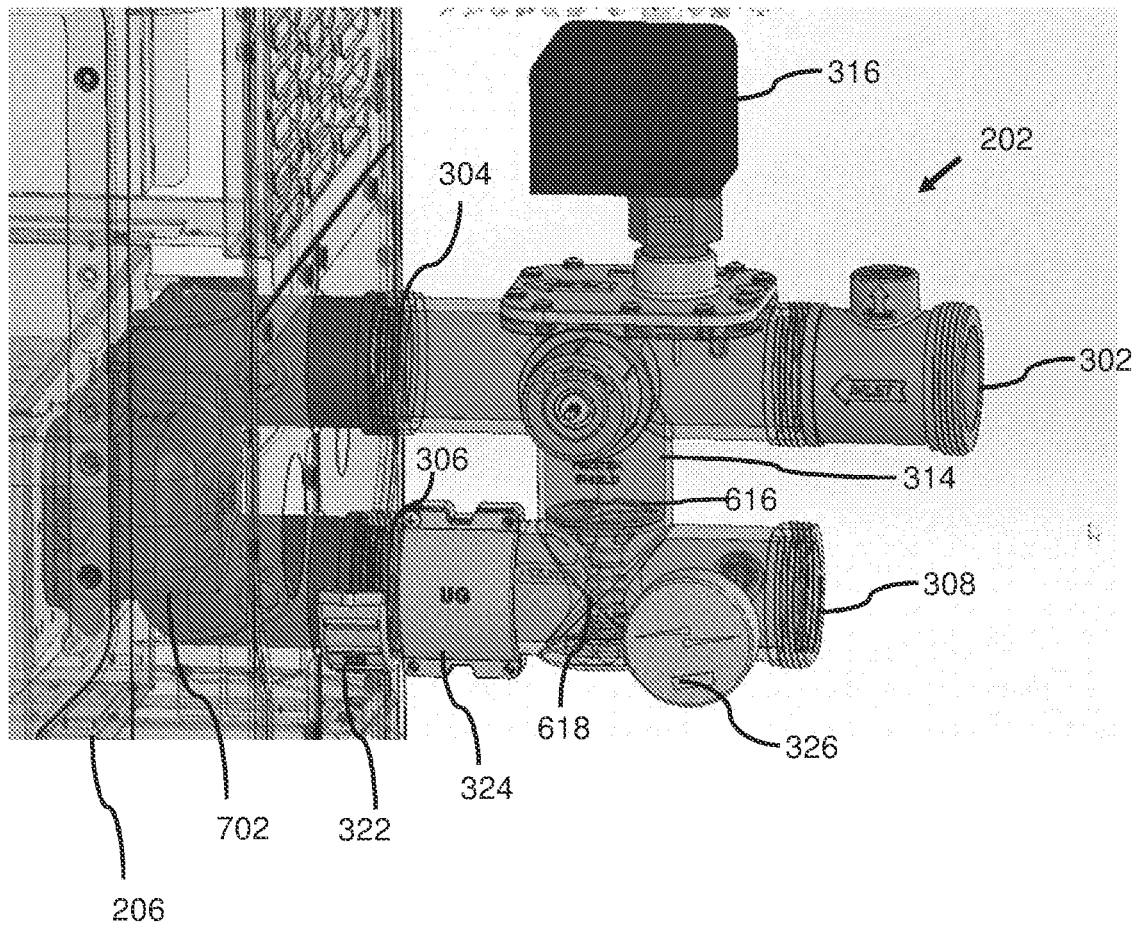
FIG. 7 illustrates partially transparent view of the bypass system of the pool heating system of FIG. 3 as connected to the heater in accordance with one or more embodiments of the present disclosure.

FIG. 7 illustrates a partially transparent view of the bypass system 200 of the pool heating system of FIG. 3 as connected to the heater 206. In certain embodiments, when water from the pool filter 104 flows through the pool water receiving port 302, the flowing water may put pressure on the circular pressure plate 616, which is disposed within the bypass line 314. The pressure may push against the restoring spring 618 and push the circular pressure plate 616 downward. Once pushed downward, the circular pressure plate 616 may clear through the bypass line 314 and extend into the path between the pool water heater receiving port 306 and the pool output port 308 of the bypass system 200. At this stage, water from the bypass line 314 may be able to flow around the circular pressure plate 616 and mix with heated water from the heater 206 as received via the pool water heater receiving port 306. This mix of heated water from the heater 206 and cooler water from the bypass line 314 may then flow back to the pool 102 via the pool output port 308.

Additional water treatment or testing modules may be added to the bypass system 200 in accordance with one or more embodiments of the present disclosure.

Figure 8:
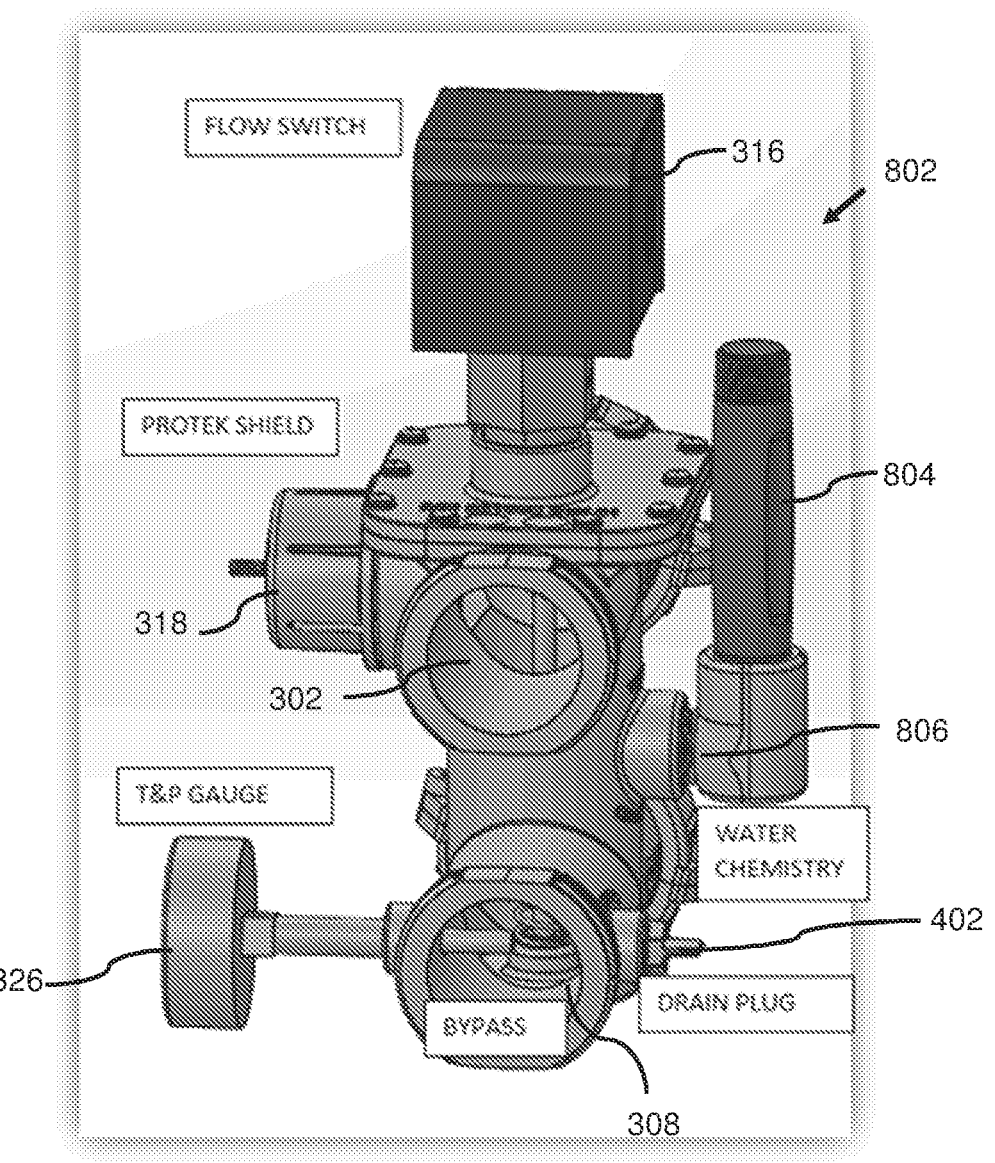
FIG. 8 illustrates a bypass system of the pool heating system of FIG. 3 with the addition of a water chemistry testing module in accordance with one or more embodiments of the present disclosure.

FIG. 8 illustrates a bypass system 802 of the pool heating system of FIG. 3 with the addition of a water chemistry testing module. For example, the bypass system 802 may include all of the elements of the bypass system 202 discussed above with reference to FIGS. 3-7, but may further include a water chemistry testing unit 804 that is configured to be attached to the bypass line 314 via a mounting port 806. In this embodiment, the water chemistry testing unit 804 may provide a real-time reading of properties of the water from the filter 104. Non-limiting examples of such properties for which the water chemistry testing unit 804 may read include pH and salinity. Any suitable water chemistry testing unit may be used herein.

Figure 9:
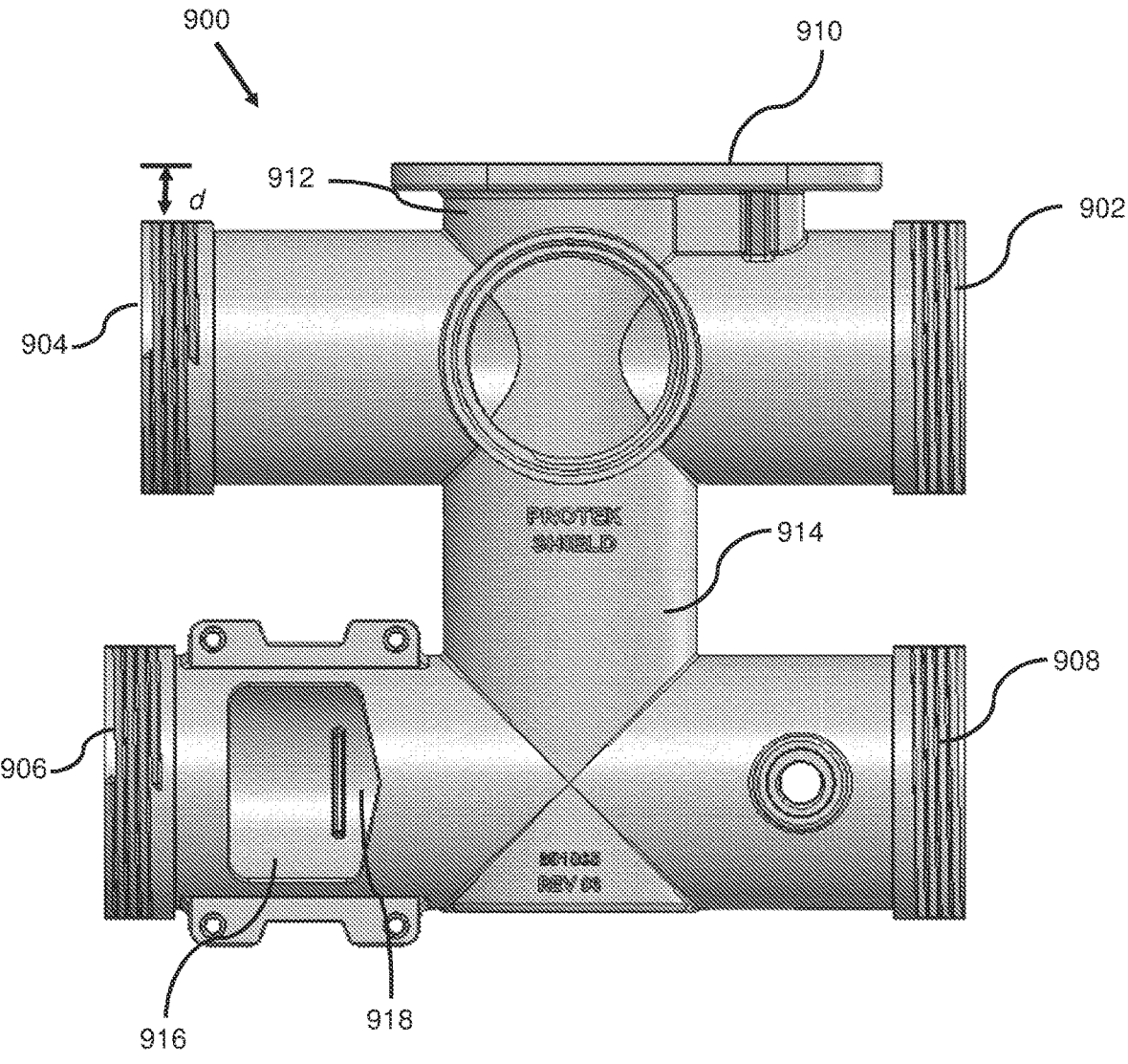
FIG. 9 illustrates another bypass body that may be used with the pool heating system of FIG. 2 in accordance with one or more embodiments of the present disclosure.

FIG. 9 illustrates another bypass body 900 that may be used with the pool heating system 200 of FIG. 2. As depicted in FIG. 9, the bypass body 900 may include a pool water receiving port 902, an output port 904, a pool water heater receiving port 906, a pool output port 908, and a bypass line 914. The pool water receiving port 902 may be configured to receive water from the pool, which in this example is via a filter. The output port 904 may be configured to output a portion of the water received by the pool water receiving port 902 to the heater input line 310 as shown in FIG. 3.

In a manner similar to that of the example discussed above with reference to FIG. 3, the heater 206 may be configured to heat water as received via the heater input line 310 by any heating method, non-limiting examples of which include gas-fired heating, electrical heating, and/or vapor compression cycle heating (e.g., a heat pump or the like). Any suitable heating systems and methods may be used.

The heater 206 may additionally be configured to output water that has been heated to a heater output line 312. The heater output line 312 may be configured to output heated water from the heater 206 to the pool water heater receiving port 906 of the bypass system 900. The bypass line 914 may be configured to divert a portion of the water received by the pool water receiving port 902 from the output port 904. The diverted portion of the water received by the pool water receiving port 902 may be mixed with the water from the pool water heater receiving port 906. In this manner, the pool output port 908 may be configured to output, to the pool 102, the mixture of the water received by the pool water receiving port 902 and the water from the pool water heater receiving port 906.

The bypass body 900 may additionally have mounted thereto or otherwise associated therewith, a flow switch similar to flow switch 316 (not shown), a sacrificial anode similar to the sacrificial anode 318 (not shown), a buttress threaded collar similar to the buttress threaded collar 320, a buttress threaded collar similar to the buttress threaded collar 322, a unitherm governor similar to the unitherm governor 324, and a temperature/pressure gauge similar to the temperature/pressure gauge 326.

The bypass body 900 differs somewhat from the bypass body 301 of FIG. 3. In particular, the bypass body 900 includes a receiving platform 910 that is configured to receive the mounting plate 602, in a manner similar to the receiving platform 605 (the gasket 606 is not shown in FIG. 9) as shown in FIG. 6. The receiving platform 910 is raised by a distance, d, above the pool water receiving port 902 and the output port 904 by a raising platform 912. In some instances, the distance, d, is about 1 inch from the top surface of the pool water receiving port 902. The distance, d, may be any suitable distance.

Further, the bypass body 900 includes a mounting hole 916 to receive a unitherm governor. The mounting hole 916 differs from the mounting hole 514 of the bypass body 301 as shown in FIG. 5, in that the mounting hole 916 includes a chevron-shaped portion 918. The chevron-shaped portion 918 may coincide with the shape of a capron, such as the capron 508 of the unitherm governor 324. The chevron-shape may facilitate mounting of the unitherm governor 324 and to prevent leaks. A capron may be removable, and therefore, replaceable through the mounting hole 916. As such, less material needs to be removed from the bypass body 900 to enable access to a capron.

Figure 10:
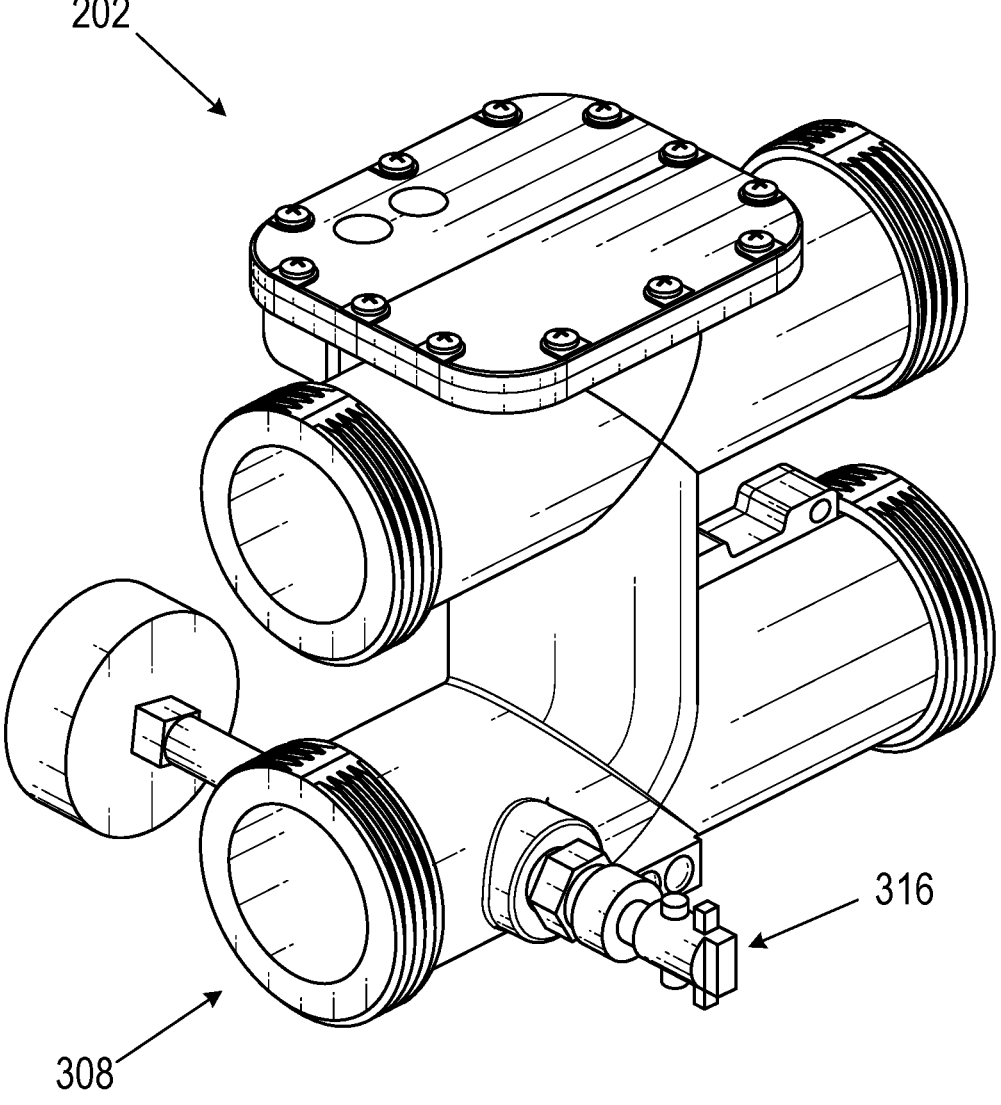
FIG. 10 illustrates a perspective view of another bypass system of the pool heating system of FIG. 2 in accordance with one or more embodiments of the present disclosure.
Figure 11:
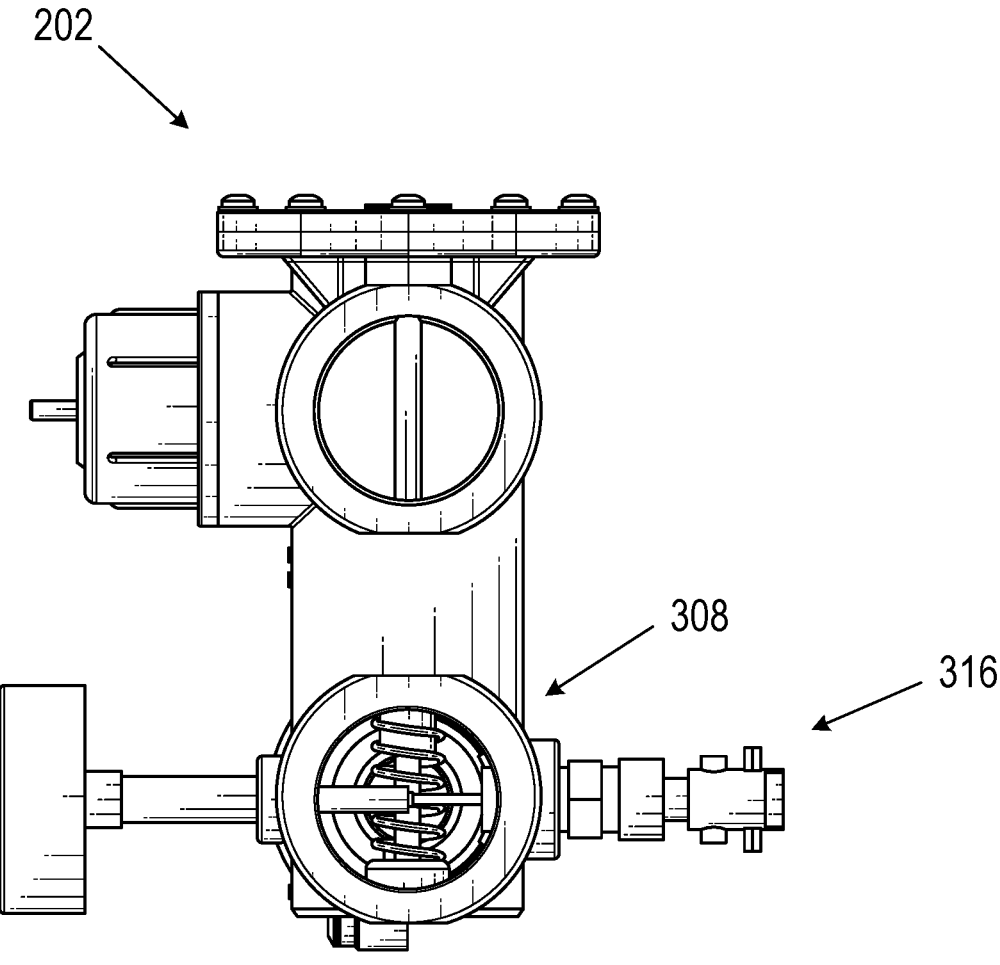
FIG. 11 illustrates a side view of the bypass system of FIG. 10 in accordance with one or more embodiments of the present disclosure.
Figure 12:
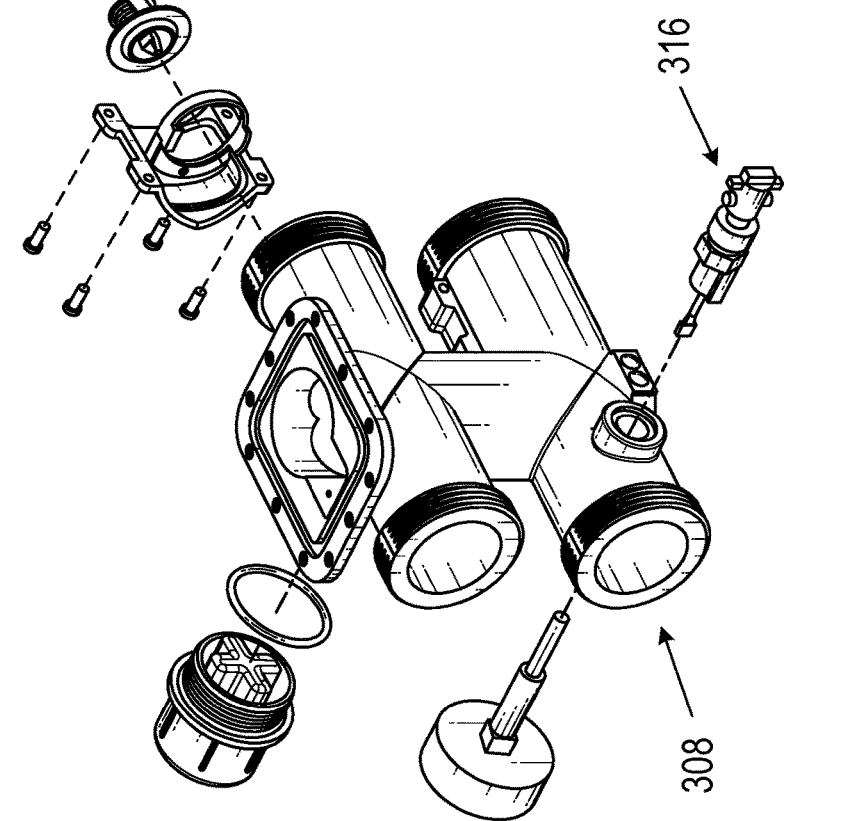
FIG. 12 illustrates an exploded view of the bypass system of FIG. 10 in accordance with one or more embodiments of the present disclosure.
Figure 12:
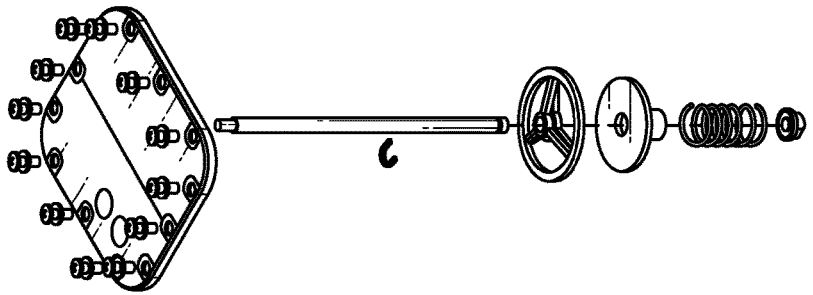

FIGS. 10-12 illustrate another bypass system 1000 of the pool heating system 200 of FIG. 2. The bypass system 1000 is similar to bypass system 202 (or any other bypass system described herein), however, the bypass system illustrates that the flow switch (for example, flow switch 316 or any other flow switch mentioned herein) may be provided at various other locations on the bypass system 1000. For example, in FIGS. 10-12, the flow switch 316 is shown as being provided at the pool outlet port 308. Additionally, in this configuration, the mounting plate 602 may not be required on the bypass system 1000.

It should be noted that a bypass unit in accordance with one or more embodiments of the present disclosure may include additional water testing units.

As discussed above, the typical pool heating systems flow water from the filter directly into a pool heater. Within the header of the pool heater, some water from the pool may be bypassed to avoid heating and be mixed with the remainder of the pool water that is heated. This bypass mixing may be used to control the flow of the water from the pool heater. However, if any maintenance is required in the bypass system, a technician must open the heater itself, open the header of the heater and then inspect, fix, and/or replace the bypass system if needed. In contrast, in accordance with one or more embodiments of the present disclosure, in the pool heating system, the bypass system is externally affixed to the pool heater. In this manner, if there is any need to inspect, fix, and/or replace the bypass system, a technician need not open the heater itself, let alone open the header of the heater.

It should be apparent that the foregoing relates only to certain embodiments of the present disclosure and that numerous changes and modifications may be made herein by one of ordinary skill in the art without departing from the general spirit and scope of the disclosure.

Although specific embodiments of the disclosure have been described, numerous other modifications and alternative embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A bypass system for use with a pool water heater having a pool water heater input port configured to receive a portion of pool water, a heating system configured to heat water received by the pool water heater input port, and a pool water heater output port configured to output heated water from the heating system, the bypass system comprising:

a pool water receiving port configured to receive water from a pool;

a bypass line configured to divert a portion of the water from the pool;

an output port configured to output a second portion of the water from the pool to the pool water heater input port of the heating system;

a pool water heater receiving port configured to receive the heated water from the pool water heater output port of the heating system;

a pool output port configured to output, to the pool, a combination of the heated water from the heating system and the diverted portion of the water from the pool; and a sacrificial anode in fluid communication with the pool water receiving port, the output port, and the bypass line, such that the second portion of water flows in contact with the sacrificial anode, wherein the bypass system is disposed about an exterior of the pool water heater, and wherein the pool water heater comprises metal.

2. The bypass system of claim 1, further comprising a flow switch disposed about the pool water receiving port and configured to display a speed of flow of the water from the pool.

3. The bypass system of claim 1, the bypass system further comprising:

a ground wire connected to the sacrificial anode to ground the sacrificial anode and promote oxidation of the sacrificial anode prior to oxidation of the pool water heater.

4. The bypass system of claim 1, further comprising a unitherm governor configured to regulate a temperature of heated water from the heating system as received from the pool water heater receiving port.

5. The bypass system of claim 1, further comprising:

a temperature sensor configured to detect a temperature of the combination of the heated water from the heating system and the diverted portion of the water from the pool; and a pressure sensor configured to detect a pressure of the combination of the heated water from the heating system and the diverted portion of the water from the pool.

6. The bypass system of claim 1, further comprising a pH detector configured to detect a pH level of the water from the pool.

7. The bypass system of claim 1, further comprising a drain plug configured to drain water from the heating system.

8. The bypass system of claim 1, wherein the pool heater comprises metal, wherein each of the pool water receiving port, the bypass line, the output port, and the pool water heater receiving port comprise a non-metal.

9. The bypass system of claim 1, further comprising:

a first buttress threaded collar configured to provide a sealed connection of the output port and the pool water heater input port; and a second buttress threaded collar configured to provide a sealed connection of the pool water heater output port and the pool water heater receiving port.

10. The bypass system of claim 1, wherein the sacrificial anode is disposed in a vertically aligned position relative to the bypass line.

11. A pool water heating system comprising:

a pool water heater comprising:

a pool water heater input port configured to receive a portion of pool water, a heating system configured to heat water received by the pool water heater input port, and a pool water heater output port configured to output heated water from the heating system, wherein the pool water heater comprises metal; and a bypass system comprising:

a pool water receiving port configured to receive water from a pool, a bypass line configured to divert a portion of the water from the pool, an output port configured to output a second portion of the water from the pool to the pool water heater input port of the heating system, a pool water heater receiving port configured to receive the heated water from pool water heater output port, a sacrificial anode in fluid communication with the pool water receiving port, the output port, and the bypass line, wherein the sacrificial anode is disposed in a vertically aligned position relative to the bypass line, and a pool output port configured to output, to the pool, a combination of the heated water from the heating system and the diverted portion of the water from the pool.

12. The pool water heating system of claim 11, wherein the bypass system further comprises a flow switch disposed about the pool water receiving port and configured to display a speed of flow of the water from the pool.

13. The pool water heating system of claim 11, wherein the bypass system further comprises:

a ground wire connected to the sacrificial anode to ground the sacrificial anode and promote oxidation of the sacrificial anode prior to oxidation of the pool water heater.

14. The pool water heating system of claim 11, wherein the bypass system further comprises a unitherm governor configured to regulate a temperature of heated water from the heating system as received from the pool water heater receiving port.

15. The pool water heating system of claim 11, wherein the bypass system further comprises:

a temperature sensor configured to detect a temperature of the combination of the heated water from the heating system and the diverted portion of the water from the pool; and a pressure sensor configured to detect a pressure of combination of the heated water from the heating system and the diverted portion of the water from the pool.

16. The pool water heating system of claim 11, wherein the bypass system further comprises a pH detector configured to detect a pH level of the water from the pool.

17. The pool water heating system of claim 11, wherein the bypass system further comprises a drain plug configured to drain water from the heating system.

18. The pool water heating system of claim 11, wherein the pool heater comprises metal, and wherein each of the pool water receiving port, the bypass line, the output port, and the pool water heater receiving port comprise a non-metal.

19. The pool water heating system of claim 11, wherein the bypass system further comprises:

a first buttress threaded collar configured to provide a sealed connection of the output port and the pool water heater input port; and a second buttress threaded collar configured to provide a sealed connection of the pool water heater output port and the pool water heater receiving port.

20. A method of heating comprising:

receiving, via a pool water receiving port of a bypass system, water from a pool;

outputting, via an output port of the bypass system, a first portion of pool water from the pool;

receiving, from the output port of the bypass system and via a pool water heater input port of a pool water heater, the first portion of pool water;

heating, via a heating system of the pool water heater, the portion of water received by the pool water heater input port to generate heated water;

outputting, via a pool water heater output port of the pool water heater, heated water from the heating system, diverting, via a bypass line of the bypass system, a second portion of water from the pool, wherein the second portion of water flows in contact with a sacrificial anode of the bypass system;

receiving, from a pool water output port of the pool water heater and via a pool water heater receiving port of the bypass system, the heated water; and outputting, from a pool output port of the bypass system and to the pool, a combination of the heated water and the second portion of pool water of the water from the pool.

* * * * *